United States Patent
Morel

(10) Patent No.: US 6,786,258 B2
(45) Date of Patent: Sep. 7, 2004

(54) RUBBER ARTICLE WITH A JUNCTION BETWEEN TWO RUBBER MIXES

(75) Inventor: Noel Morel, Enval (FR)

(73) Assignee: Michelin Recherche et Technique S.A., Granger-Paccot (CH)

( * ) Notice: Subject to any disclaimer, the term of this patent is extended or adjusted under 35 U.S.C. 154(b) by 0 days.

(21) Appl. No.: 09/845,904

(22) Filed: Apr. 30, 2001

(65) Prior Publication Data

US 2001/0026855 A1 Oct. 4, 2001

Related U.S. Application Data

(63) Continuation of application No. PCT/EP99/08179, filed on Oct. 28, 1999.

(30) Foreign Application Priority Data

Nov. 2, 1998 (FR) .............................. 98 13777

(51) Int. Cl.⁷ .............................. B60C 1/00; B60C 11/01
(52) U.S. Cl. .................. 152/209.16; 152/151; 152/450; 152/523; 152/541
(58) Field of Search ......................... 152/209.16, 209.5, 152/523, 525, 209.1, 524, 151, 450, 541; 428/60; 156/134, 130.7, 129, 258, 304.5, 157, 159

(56) References Cited

U.S. PATENT DOCUMENTS

| | | | |
|---|---|---|---|
| 1,356,891 A | | 10/1920 | Steinle |
| 2,706,833 A | * | 4/1955 | Doherty ...................... 156/258 |
| 2,789,616 A | * | 4/1957 | Cuthbertson et al. ....... 152/523 |
| 3,504,710 A | | 4/1970 | Pancoast ..................... 138/170 |
| 3,584,343 A | | 6/1971 | Kohlepp et al. ............... 18/13 |
| 3,719,218 A | * | 3/1973 | Leybourne, III ............ 152/527 |
| 4,152,186 A | * | 5/1979 | Shibata .................. 152/209.16 |
| 4,325,423 A | | 4/1982 | Seitz et al. .................. 152/361 |
| 5,356,682 A | | 10/1994 | Stewart et al. ................ 428/57 |
| 5,538,059 A | * | 7/1996 | Brayer ........................ 152/523 |

FOREIGN PATENT DOCUMENTS

| | | | | |
|---|---|---|---|---|
| DE | 3515944 A1 | * | 11/1986 | |
| JP | 53-146779 | * | 12/1978 | |
| JP | 60-38211 | * | 2/1985 | |
| JP | 62-6801 | * | 1/1987 | ............ 152/209.12 |
| JP | 3-169712 A | * | 7/1991 | |
| JP | 07205332 | | 8/1995 | |
| JP | 10-147113 | * | 6/1998 | |

OTHER PUBLICATIONS

English–language Abstract for JP 07 205 332.

* cited by examiner

Primary Examiner—Geoffrey L. Knable
(74) Attorney, Agent, or Firm—Burns, Doane, Swecker & Mathis, L.L.P.

(57) ABSTRACT

A rubber article, such as a tire, composed of at least two rubber mixes with different composition and properties, the said two mixes having a lap joint characterized in that at least one edge of at least one of the two mixes has an end with an oscillatory trace-line.

6 Claims, 3 Drawing Sheets

US 6,786,258 B2

RUBBER ARTICLE WITH A JUNCTION BETWEEN TWO RUBBER MIXES

BACKGROUND OF THE INVENTION

This is a continuation of pending PCT/EP99/08179, filed Oct. 28, 1999.

The invention concerns a rubber article composed of at least two vulcanized mixes having different composition and properties, and having between them a lap joint. More particularly, it concerns a tire whose various constituent mixes are joined by superposition of an edge of one of the mixes over another mix.

Junctions between mixes such as those mentioned above, when subjected to stresses (whether tension, compression or shear), represent a particularly vulnerable area of the article considered, the life of the article being greatly limited by the destruction of the joint, whether this destruction be due to adhesion failure or to stress concentration at the location of the joint, or even to external aggression in the case of some junctions.

The purpose of the invention is to improve the life of the article considered by causing the junction(s) between rubber mixes constituting the said article to be less influenced by the known causes of its/their destruction.

SUMMARY OF THE INVENTION

The vulcanized rubber article according to the invention, which consists of at least two rubber mixes having different composition and properties, the said two mixes having between them a lap joint, is characterized in that at least one of the edges of at least one of the two mixes has an end whose trace-line resembles an oscillating movement, namely an oscillating trace-line.

The thickness of the edge of the mix in question is preferably constant over a width at least equal to the desired trace-line amplitude: the said thickness being in any case less than 2 mm in the non-vulcanized condition such that the molding and vulcanization of the finished article obliterates the surface irregularities created at the junction of the two mixes.

Any trace-line may be suitable (trace-lines of stationary or non-stationary oscillations), the preferred trace-lines being the sinusoidal trace-line of a harmonic oscillation and the circular trace-line (in which the line corresponding to a half-period is a semicircle).

The preferred application of the crenellated or serrated edge(s) relates to the joining of two rubber mixes constituting a tire, whether this junction emerges on an external wall of the tire or is totally internal. The application is particularly advantageous for junctions on the sidewall of the tire between the mix used for the tread and that used for the sidewall.

An oscillatory trace-line can be characterized by an amplitude and a wavelength. The amplitude measured crest to crest, whether variable or not, is in the case of tire applications preferably between 3 mm and 15 mm. As for the wavelength, this is preferably between 0.1% and 2% of the circumferential extension of the tire measured in the equatorial plane.

DESCRIPTION OF THE DRAWINGS

The characteristics and advantages of the invention will be better understood from the description below, which refers to the drawings illustrating non-limiting example embodiments and in which.

DESCRIPTION OF THE PREFERRED EMBODIMENTS

Figure 1A:
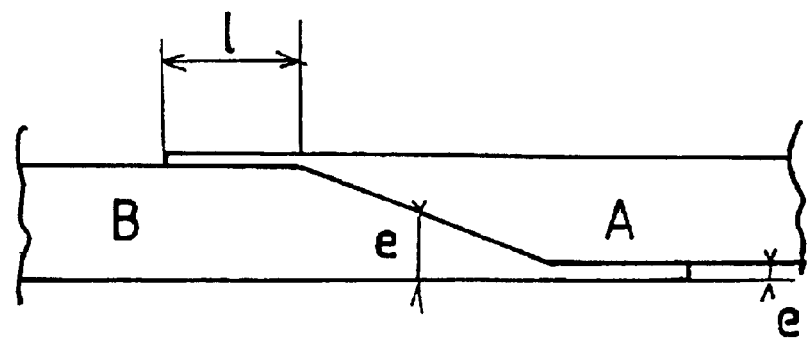
FIGS. 1A and 1B show schematically a first variant of a junction between two rubber mixes, respectively seen in cross-section and in plan view.
Figure 1B:
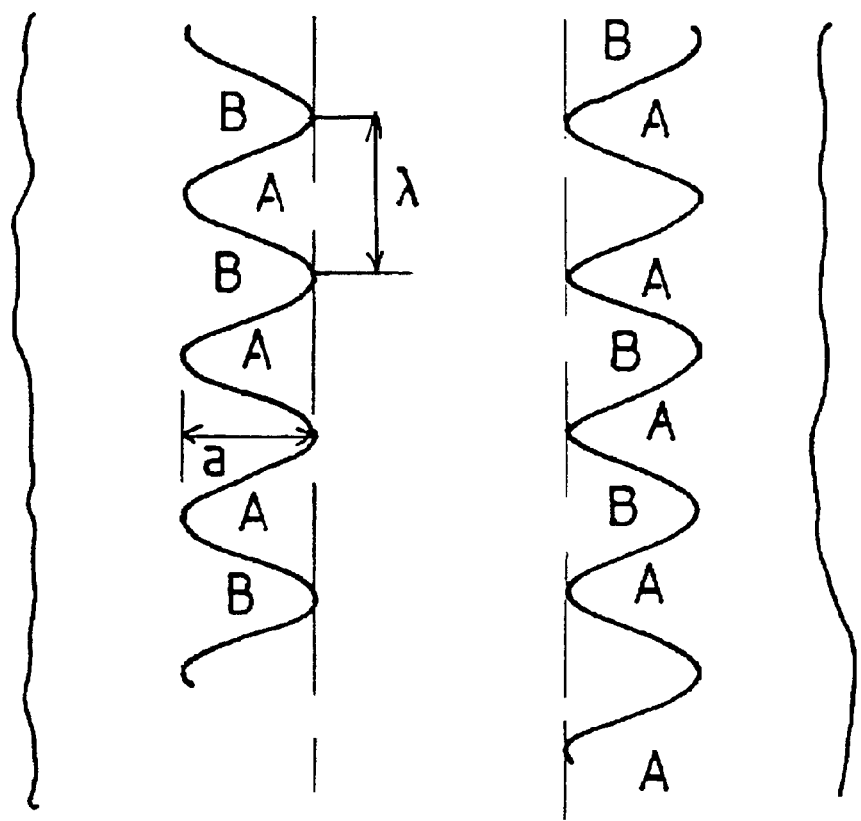

A vulcanized rubber plate (FIG. 1A) seen in cross-section, is composed of two rubber mixes A and B, whose composition and consequently whose properties are different. The said two mixes, in the non-vulcanized condition, are shaped by passing between the rollers of a calendering roll or by passing into a blade of an extruder, and the edges of each section have a thickness e that decreases regularly from the maximum thickness down to a thickness of at most 2 mm and in the case described is equal to 0.6 mm, the said thickness remaining constant as far as the edges of the section. The junction of the two mixes is formed by the two sloping edges and the tongues of constant thickness and width equal 1 to 7 mm. The said tongues have an undulating shape (FIG. 1B), such that the end of the edge of each mix has a sinusoidal trace-line with crest to crest amplitude a equal to 5 mm and wavelength $\lambda$ equal to 10 mm.

Figure 2A:
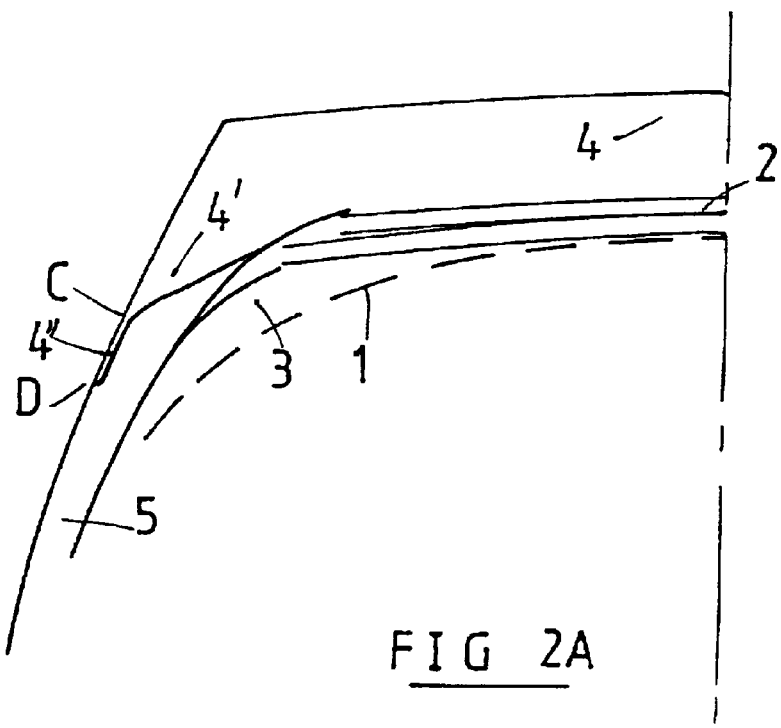
FIGS. 2A and 2B show the junction between a tread mix and a sidewall mix in a touring vehicle tire, respectively seen in cross-section and in plan view.
Figure 2B:
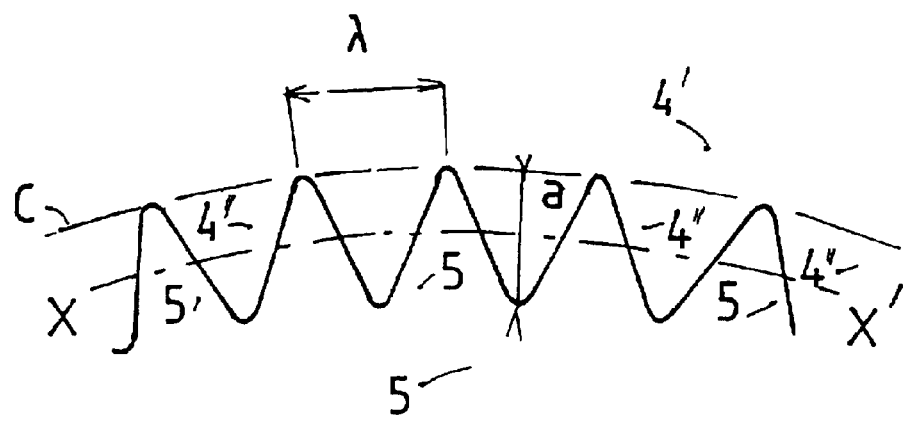

FIGS. 2A and 2B concern the preferential application of the principle described above and show a partial view of the upper part of a cross-section through a tire of size 175/70.R.13. The said tire comprises a radial carcass reinforcement 1 surmounted radially by a crown reinforcement 2 consisting of two plies of metallic cables crossed from one ply to the next and making with the circumferential direction an angle of 22°. The edges of the said crown 2 are joined to the carcass reinforcement 1 by sections 3. A tread 4 covers the reinforcement 2 radially and is connected to a sidewall rubber 5. The junction between the tread 4 and the sidewall rubber 5 is formed by the edge of the said tread with a portion 4' whose thickness decreases as far as the point C and a portion 4" or tongue with constant thickness equal to 0.6 mm between the points C and D on the outer wall of the tire. The said tongue 4" is shown in section in FIG. 2B: the oscillating trace-line at its end is formed of a succession of triangles with rounded peaks on either side of a central axis XX'. The amplitude a is equal to 5 mm and the wavelength $\lambda$ to 10 mm, the latter representing 0.55% of the circumferential extension of the tire measured in the equatorial plane ZZ'.

Figure 3A:
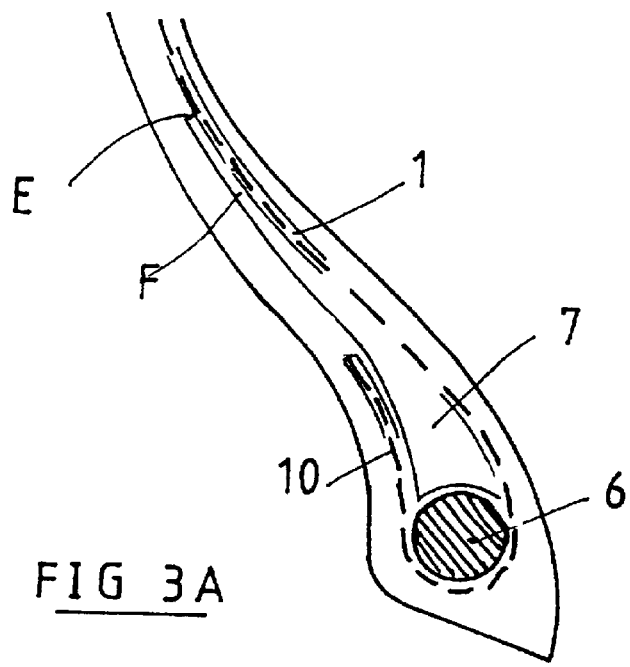
FIGS. 3A to 3C show an internal junction between the upper edge of the quasi-triangular section above the bead wire of a tire and the mix used to line the carcass ply of the said tire.
Figure 3B:
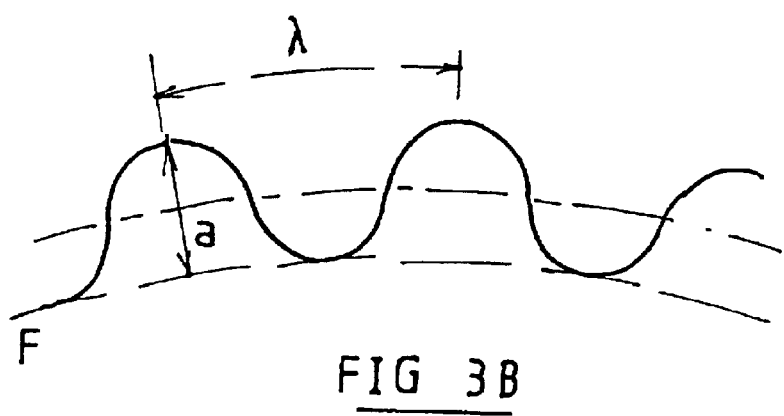
Figure 3C:
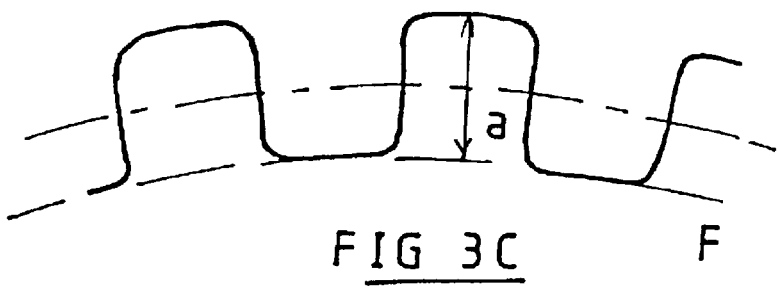

The last example, shown in FIGS. 3A to 3C, concerns an internal junction of the tire and more particularly the junction between the radially uppermost point of the section 7 of rubber mix located radially above the anchoring bead-wire 6 of the carcass reinforcement 1 and on the one hand the layer of rubber mix covering the cables of the carcass reinforcement 1 (lining of the ply) and on the other hand the rubber mix located axially outside the said point. As described earlier, the section 7 has an edge with a part whose thickness decreases and a part EF with constant thickness equal in this case to 0.5 mm and width equal to 5 mm. The part EF has an end which describes a periodic trace-line said to be semicircular as shown in FIG. 3B, with an amplitude a of a 3.0 mm and a wavelength $\lambda$ of 6.0 mm. The said trace-line may also be a periodic trapezoidal trace as shown in FIG. 3C, with the same values of amplitude and wavelength, without compromising the junction between the mixes.

Comparison tests between tires having junctions with straight edges between tread and sidewall rubber and tires having junctions between the some mixes with periodic trace-lines as described in the part of the description relating to the junction concerned, demonstrate the very clear superiority of the solution according to the invention, since tires designed in that way have covered distances, before the appearance of any initiation of degradation, twice as far as those covered by tires having junctions with a straight trace-line between the tread and the sidewall rubber, both when rolling under overload and when rolling in an ozonated environment. Similarly, junctions according to the invention used in the lower portion of a tire between the section above the bead-wire and the lining of the carcass reinforcement, make it possible to use for the section 7 mixes which, in terms of their composition, are not very compatible in adhesion with the lining mixes customarily used.

I claim:

1. A tire made of vulcanized rubber of at least two rubber mixes of different composition and properties, the said two mixes forming a lap joint in which at least one edge of at least one of the two mixes is superimposed over the other of the two mixes and has an end with an oscillatory trace-line in the plane of the joint, said at least one edge being of a reduced thickness relative to the maximum thickness of said least one of the two mixes, said oscillatory trace-line extending over the full thickness of said at least one edge, and said at least one of the two mixes being free of reinforcement cords, wherein the thickness of said at least one edge is substantially uniform over the amplitude of the oscillatory trace-line.

2. A tire made of several vulcanized rubber mixes, characterized in that at least one lap joint between two mixes is made by overlapping an edge of one of the mixes over the other mix, said edge having an end with an oscillatory trace-line in the plane of the overlap and being of a reduced thickness relative to the maximum thickness of said one mix, said oscillatory trace-line extending over the full thickness of said edge, and said one of the mixes being free of reinforcement cords, wherein the thickness of said edge is substantially uniform over the amplitude of the oscillatory trace-line.

3. A tire according to claim 2, characterized in that said one edge overlays an edge of the other mix and that said one edge or both of said edges have an end with an oscillatory trace-line.

4. A tire according to claim 3, characterized in that the two mixes concerned include a mix for a tread of the tire and a mix for a sidewall of the tire and that the two mixes define a junction emerging on an outer wall of the tire.

5. A tire made of several vulcanized rubber mixes, characterized in that at least one lap joint between two mixes is made by overlapping an edge of one of the mixes over the other mix, said one of the mixes being free of reinforcement cords, wherein said one edge overlays an edge of the other mix and said one edge or both of said edges have an end with an oscillatory trace-line, and wherein the two mixes include a mix for a tread of the tire and a mix for a sidewall of the tire and the two mixes define a junction emerging on an outer wall of the tire, wherein at the junction an edge of the tread has a portion with decreasing thickness extended by a portion of constant thickness equal to at most 2 mm, the portion of constant thickness ending in an oscillatory trace-line.

6. The tire of claim 5, wherein the trace-line has an amplitude between 3 mm and 15 mm and a wavelength between 0.1% and 2.0% of the circumferential extension of the said tire measured in the equatorial plane.

* * * * *